United States Patent [19]

Kanetou et al.

[11] 4,211,921
[45] Jul. 8, 1980

[54] SENSOR FOR USE IN CONTROLLING OPERATION OF MOBILE FARMING MACHINE

[75] Inventors: Yuuji Kanetou; Hirofumi Uetani, both of Matsuyama, Japan

[73] Assignee: Iseki Agricultural Machinery Mfg. Co. Ltd., Matsuyama, Japan

[21] Appl. No.: 874,879

[22] Filed: Feb. 3, 1978

[51] Int. Cl.² .................................... G06K 11/02
[52] U.S. Cl. .................................... 250/202; 180/169
[58] Field of Search .................... 250/202; 180/98

[56] References Cited

U.S. PATENT DOCUMENTS 3,718,821   2/1973   Vischulis .................... 250/202

*Primary Examiner*—David C. Nelms
*Assistant Examiner*—Darwin R. Hostetter
*Attorney, Agent, or Firm*—Arthur T. Fattibene

[57] ABSTRACT

A sensor for use in controlling the operation of a mobile farming machine which has an image taking means carried by the machine and adapted to take the image of a part of the field to be worked, and photoelectric converting means adapted to convert the image into electric signal. The photoelectric converting means consist of a plurality of photoelectric elements disposed in a row crossing the line of movement of the machine, so that the states of the photoelectric elements are changed as the position of a boundary involved by the image taken by the image taking means is moved. Thus, the deviation of the machine from the correct course is detected through the change of states of the photoelectric elements. The image is optically compressed in the direction of movement of the machine, or the output from the photoelectric means is electrically compressed in that direction, so that the final controlling signal is integrated in the direction of movement of the machine, so as to ensure an accurate detection of the boundary.

7 Claims, 13 Drawing Figures

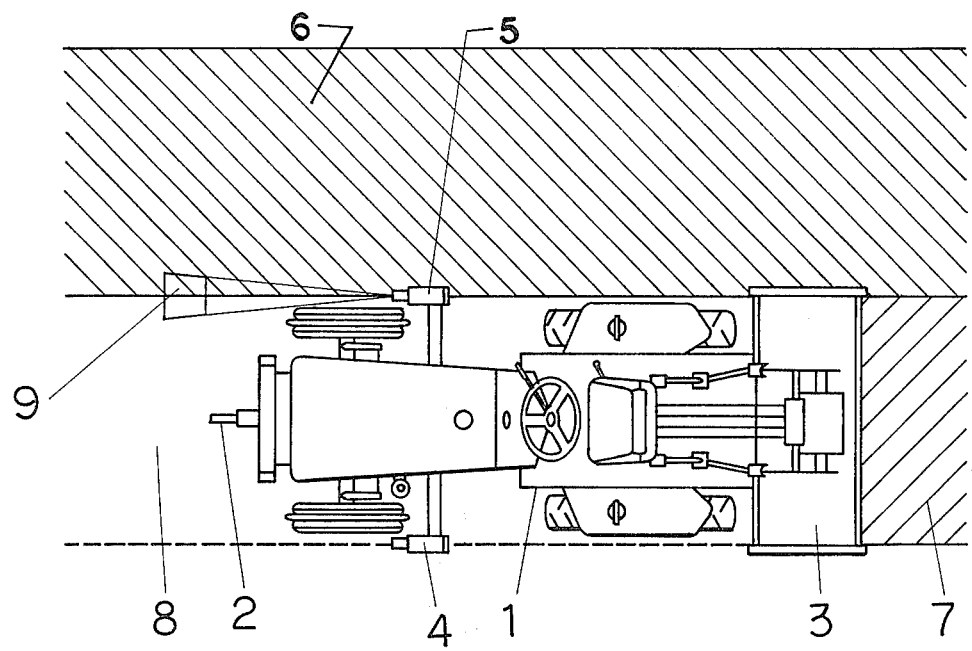
FIG.1
FIG.2
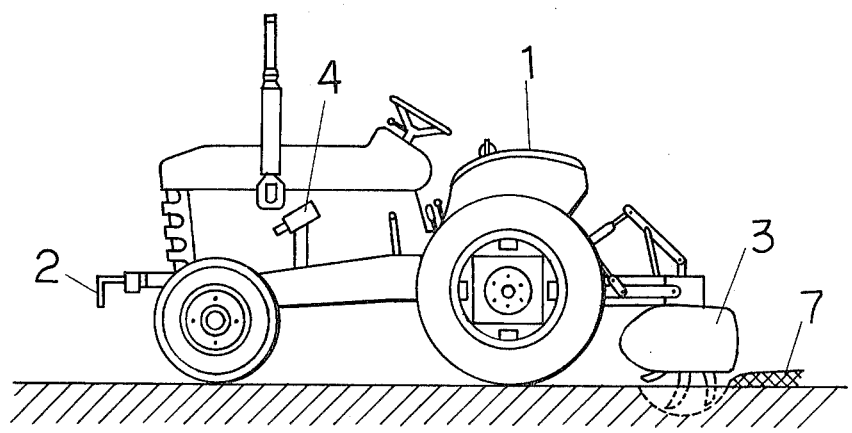

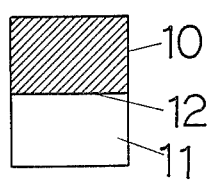
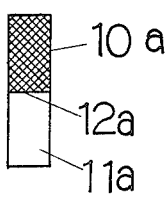
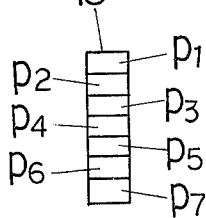
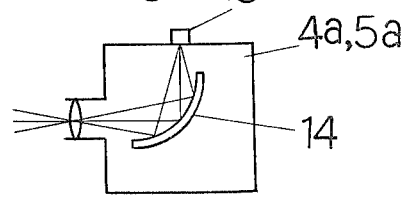
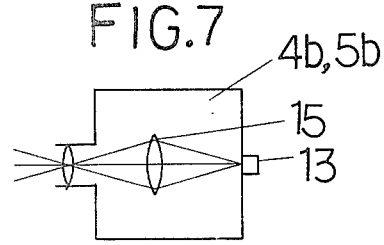
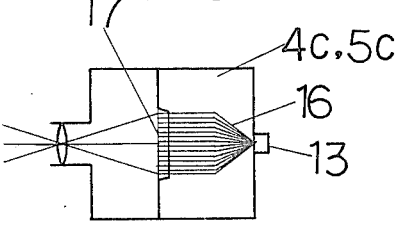
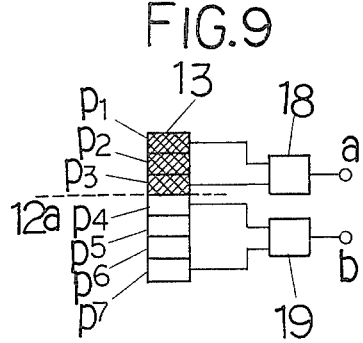
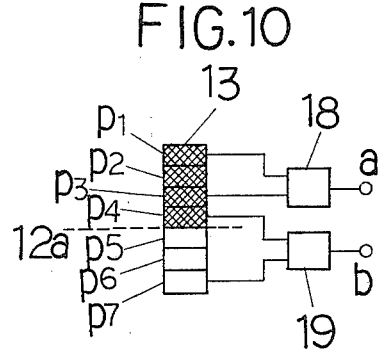
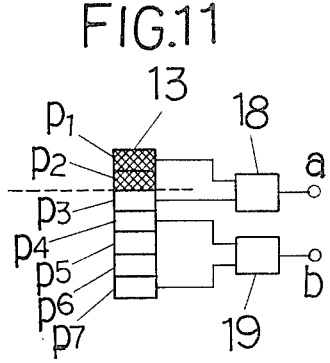
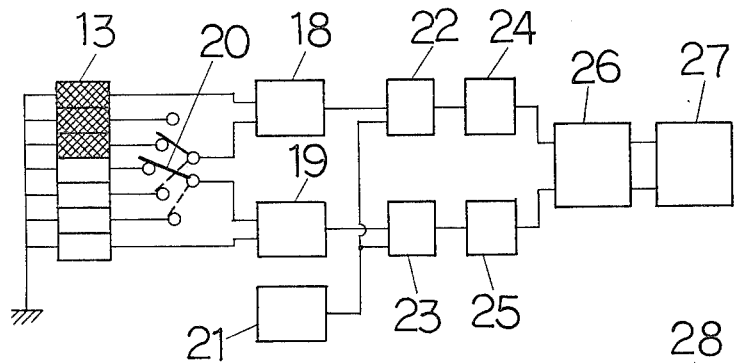
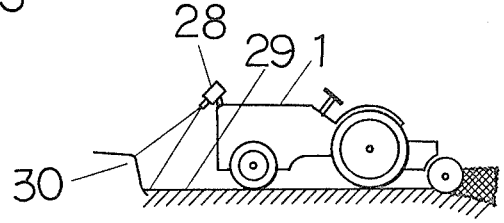

SENSOR FOR USE IN CONTROLLING OPERATION OF MOBILE FARMING MACHINE

BACKGROUND OF THE INVENTION

The present invention relates to a sensor for use in operating mobile farming machineries and, more particularly, a sensor adapted to control the operation of the farming machineries by means of an electric signal obtained through a photoelectric conversion of an optical image of a paddy field.

In automatic operation of a mobile farming machine, it is often required to control the machine to make it run along a predetermined path of work.

Various types of sensors have been proposed and used for this automatic control of the machine. Among these sensors, a sensor incorporating sensing lever and a switch combined with the latter is most popular. However, this type of sensor requires objects suitably disposed in the paddy field so as to be contacted by the sensing lever, as well as various preparatory works. At the same time, this mechanical type of sensor is considerably large and occupies a large installation space on the machine, so that it can be attached only to selected portions of the machine. In addition, the mechanical sensor is apt to be broken by an accidental application of external force. Furthermore, the contacts of the electric switch tends to be deteriorated, due to the atmosphere of the working environment.

SUMMARY OF THE INVENTION

It is therefore an object of the invention to provide an improved sensor capable of overcoming above stated problems of the prior art.

To these ends, according to the invention, there is provided a sensor having an image-taking means adapted to receive the light from a part of a paddy field, and photoelectric converting means having a plurality of photoelectric elements and adapted to directly or, alternatively, in an integration in the direction of the movement of the machine, converting the obtained boundary image into a photoelectric output. The states of the photoelectric elements are changed as the boundary line of the received boundary image moves, so that the boundary is detected precisely and with a high degree of sensitivity, without necessitating a mechanical contact of the sensor with an object on the field.

The above and other objects, as well as advantageous features of the invention will become more clear from the following description of the preferred embodiments taken in conjunction with the accompanying drawings.

BRIEF DESCRIPTION OF THE DRAWINGS

FIG. 1 is a plan view of a tractor on which a sensor embodying the invention is mounted, FIG. 2 is a side elevational view of the tractor, FIG. 3 is an illustration showing a boundary image taken by a camera, FIG. 4 is an illustration showing the compressed image, FIG. 5 is an illustration explanatory of photoelectric converting means, FIGS. 6, 7 and 8 are side elevational views of internal structures of different examples of the camera, FIGS. 9, 10 and 11 are block circuit diagrams for explaining the operation of the photoelectric converting means for transmitting the directional controlling signal, FIG. 12 is a block circuit diagram of another embodiment of the invention, and FIG. 13 is a side elevational view of a tractor on which a sensor, which is another embodiment of the invention, is mounted.

DESCRIPTION OF THE PREFERRED EMBODIMENTS

Referring to the drawings, a turn sensor 2 is attached to a front portion of a farming machine 1 such as a tractor adapted to tract a cultivator 3. Cameras 4 and 5 as the image taking means are attached to both sides of the machine 1. In FIG. 1, the machine is shown to move leftward as viewed on the drawing, so as to cultivate the ground by the cultivator 3 to form a cultivated ground 6. It is assumed here that the machine has made an abrupt rightward turn by 180° at the righthand side end of the field which is not shown, after running rightward.

Thus, the area to the right from the cultivator 3 is an already cultivated ground 7, while the area 8 to the left from the cultivator 3 has not been cultivated.

The cameras 4 and 5 are taking images of a part of the field in front of the machine 1. In the illustrated state, only the camera 5 is working, while the other camera 4 is not operated. The camera 5 takes the image of an area 9 which involves the boundary between the already-cultivated and uncultivated areas 6 and 8, so as to receive the image of the area 9. As the machine further moves to the left-hand side end of the course, the turning sensor is operated to cause a leftward turn by 180° of the machine, so that the latter moves rightward along the next path of work. During the rightward going of the machine, the camera 4 is put into operation while the operation of the camera 5 is suspended.

The operation for converting the boundary image received by the cameras 4, 5 into electric signals will be described hereinafter. Referring to FIG. 3 showing the boundary image taken by the camera, reference numerals 10, 11 and 12 denote, respectively, an already-cultivated area, uncultivated area and the boundary between these areas.

This boundary image is changed to an image compressed in the direction of movement of the machine, by means of a columnar concave mirror, columnar convex lens, optic fibers and so on.

FIG. 4 shows the compressed boundary image in which 10a, 11a and 12a denote the compressed images of the cultivated area, uncultivated area and the boundary.

Referring now to FIG. 5 showing a photoelectric converting device 13 having a plurality of photoelectric elements disposed in a row perpendicular to the direction of running of the machine, i.e. to the longitudinal direction of the compressed image of the boundary. The photoelectric elements P1 to P7 consist of elements which produce electric signals in accordance with the intensity of the light, e.g. phototransistors, photodiodes, photoelectric resistors and the like.

The photoelectric converting device 13 has a shape substantially same as that of the compressed boundary image. The device 13 and the compressed image are superimposed so that the photoelectric elements P1 to P7 produce electric signals in correspondence with the intensities of the corresponding portions of the image, so as to provide a photoelectric output integrated in the direction of running of the machine.

Supposing here that the boundary 12a is positioned between the photoelectric elements P3 and P4, the outputs from the elements P1 to P3 are relatively small because these elements confront the compressed image 10a of the cultivated area, while the photoelectric elements P4 to P7 produce larger outputs, because they confront the compressed image 11a of the uncultivated area.

Since the boundary image is compressed to conform the photoelectric converting device, the boundary line is clearly detected, even when the appearance of the objective area 9 is partially or locally changed, because the image is compressed to provide the photoelectric output in the form of an integrated value.

At the same time, since the image formed by the light collected from relatively large area is compressed to have smaller area, a sufficiently high sensitivity of the sensor is ensured even rather dark condition.

An explanation will be made hereinafter as to the actual example of optical compression of the boundary image. FIG. 6 shows a camera in which a columnar concave mirror 14 is mounted. This mirror reflects an image which is compressed only in the direction of running of the machine, to the photoelectric converting device 13. FIG. 7 shows another example in which a convex lens 15 is provided in the camera which refrects the light only in the direction of the machine running, so that the compressed image may be delivered to the photoelectric converting device 13. In still another example as shown in FIG. 8, a plurality of optic fibers 16 are disposed in the camera, so as to guide the light such that the image may be compressed in the direction of machine running.

Hereinafter, an explanation will be made as to the operation of the photoelectric converting device 13 for controlling the running direction of the machine, by making use of the camera as the sensor.

The photoelectric elements P1 and P3 are connected to the input side of a comparator 18, while the elements P4 and P7 are connected to the input side of the comparator 19. Since the intensities of light received by the elements P1 and P7 do not largely fluctuate even when the machine body is swung right and left, because they are sufficiently spaced from the position of the boundary line on the image, so that they can serve as the reference elements adapted to provide reference signals of the images of cultivated and uncultivated areas. Thus, the outputs from the elements P1 and P7 are delivered to respective comparators as the reference signals.

Supposing here that the machine is running straight in the correct course, and assuming that the boundary line 12 of the image is positioned between the photoconductive elements P3 and P4, the elements P1 to P3 senses the image of the cultivated area, while the elements P4 to P7 sense the image of uncultivated area, as shown in FIG. 9. In this state, no signal is delivered from the output terminals a and b of the comparators 18 and 19, because the inputs to each of the comparators are of the same level. However, when the course of the machine is deviated, e.g. to the right, the boundary line 12 is moved leftward, so that the image of the cultivated area is sensed by the elements P1 to P4, while the image of the uncultivated area is sensed by the elements P5 to P7.

Consequently, since the output from the element P4 differs from the reference signal delivered from the element P7, an output is obtained from the terminal b of the comparator 19, although no output is available at the terminal of the comparator 18. The output from the comparator 18 is then suitably treated and used for correcting the course of the machine to the left, so that the machine may run along the correct path of work.

To the contrary, assuming that the course of the machine is deviated to the left, the boundary line 12 is displaced to the right, so that the elements P1 and P2 sense the image of the cultivated area, while the image of the uncultivated area is received by the elements P3 to P7. Consequently, the levels of the inputs to the comparator 18 come to differ from each other, so that the terminal a delivers an output. This signal is used for correcting the course of the machine body to the right, so that the machine may run along the correct path of work.

Although the photoelectric elements in the illustrated embodiments are disposed at a constant pitch, i.e. equispaced, it will be seen that the precision of the control is enhanced when the elements are disposed such that the distance between the elements positioned relatively outward is large while the distance between the elements positioned at relatively inner side, i.e. closer to the boundary line, is small.

In this embodiment, the electric signal is obtained by at first optically compressing the boundary image, and then photoelectrically converting the compressed boundary image.

However, it is possible to directly convert the image and then electrically compress the converted signal, so as to obtain the photoelectric output integrated in the direction of movement of the machine.

Referring to FIG. 12 showing a block circuit diagram of another embodiment, the position of the boundary suitably by means of a change-over switch 20. The outputs from the comparators 18 and 19 are input to AND circuits 22,23, along with the output signal from the direction control signal generator 21, and delivered to a direction switching hydraulic controlling section 26. The signal delivered from the latter is input to a steering controlling cylinder to operate the same. This change-over switch may be of any type including mechanical contact type, semiconductor type and so forth.

FIG. 13 shows another embodiment in which a camera 28 is mounted at the front portion of the machine 1, so as to detect the boundary between the ridge 30 and the area 29 to be cultivated, and is used as the turning sensor.

The sensor of the invention can be used for automatically stopping the mobile farming machine and can be incorporated in various farming machines other than the cultivating tractor, e.g. rice-planting machine, combine and other vehicles, for automatically controlling the operation of these machines.

As has been described, according to the invention, there is provided a sensor for controlling the operation of the mobile farming machine, comprising image taking means adapted to optically take the image of a part of a field, and a photoelectric converting means including a plurality of photoelectric elements adapted to directly or, alternatively, in the manner integrated in the direction of the machine running, convert the optical image photoelectrically. The states of the photoelectric elements of the photoelectric converting means are changed as the boundary line in the image taken by the image taking means is moved. The outputs from these photoelectric elements are suitably compared to produce a signal for controlling the direction of movement of the machine, so as to ensure a precise detection of the boundary at a high sensitivity, thereby to afford a perfect automatic operation of the mobile farming machine.

What is claimed is:

1. In combination, a vehicle which is driven along a predetermined path in working a field, and a sensor for controlling the operation of said vehicle in working the field, said sensor comprising a camera mounted on said vehicle so as to optically view the image of the line defining the boundary of the worked and unworked portions of the field to define the path of travel of said vehicle, said camera including means for compressing said image, and photoelectric converting means comprising a plurality of photoelectric elements operatively associated with said camera, said photoelectric elements being arranged in a row disposed generally normal to the image of said boundary line whereby the direction of movement is controlled by detecting the degree of shifting of said line image on said array of photoelectric elements by comparing the photoelectric output from said photoelectric elements.

2. A sensor as claimed in claim 1, characterized in that the position of the boundary line of said boundary image on the row of said photoelectric elements can optionally be changed.

3. A sensor for use in controlling the operation of a mobile farming machine comprising: image taking means mounted on said mobile farming machine which runs on a field to be worked, and adapted to optically take the image of a part of said field; and photoelectric converting means adapted to produce a photoelectric output corresponding to the boundary image taken by said image taking means in such a manner that said output is integrated in the direction in which said machine moves, wherein the direction of movement of said machine is controlled in accordance with said photoelectric output.

4. A sensor as claimed in claim 3, characterized in that said photoelectric output is obtained after optically compressing the boundary image taken by said image taking device in the direction of movement of said machine.

5. A sensor as claimed in claim 3, wherein said photoelectric output integrated in the direction of movement of said machine is obtained by electrically compressing the output from said photoelectric converting means which directly converts the boundary image taken by said image taking means into electric signal.

6. A sensor as claimed in claim 3, characterized in that said image taking means are mounted at a front portion of said machine for sensing the arrival of said machine at the end of the field to be worked by detecting the boundary of said end, said machine being so controlled as to make a turn by the output from said image taking means.

7. In combination, a vehicle which is driven along a predetermined path in working a field wherein the path of travel of said vehicle is determined by the boundary line between the worked and unworked portions of the field, and a sensor for controlling the operation of said vehicle for guiding said vehicle along said boundary line, said sensor comprising a camera mounted on said vehicle so as to optically view the line defining said boundary, said camera including means for compressing the image of the viewed area of said boundary line, and photoelectric converting means comprising a plurality of photoelectric elements operatively associated with said camera, said photoelectric elements being arrayed in a row disposed normal to the image of said boundary line, said photoelectric converting means having a shape substantially the same as that of the compressed boundary line image, whereby the compressed image is superposed on the photoelectric converting means to produce electric signals corresponding with the intensities of the corresponding portions of the superimposed images, said photoelectric elements being disposed into two groups of elements, each group including an outermost element and an innermost element, a pair of comparator means, and the outer and innermost elements of one group having their respective outputs connected to the input of one of the said comparators, and the outermost element and innermost element of the other group having their respective outputs connected to the input of the other comparator means whereby the signal of the outputs of the outermost elements are delivered to their respective comparators as a reference signal against which is compared to a signal emitted by the corresponding innermost elements of said groups which varies as the boundary image is shifted as the vehicle travels along said boundary so that the output signal from one comparator or the other is utilized to correct the movement of said vehicle to follow said boundary line.

* * * * *